(12) United States Patent
Jaini et al.

(10) Patent No.: US 11,592,481 B1
(45) Date of Patent: Feb. 28, 2023

(54) UNIFIED APPROACH FOR IMPROVED TESTING OF LOW POWER DESIGNS WITH CLOCK GATING CELLS

(71) Applicant: Ambarella International LP, Santa Clara, CA (US)

(72) Inventors: Praveen Kumar Jaini, Sunnyvale, CA (US); Srihari Raju Saripella, San Jose, CA (US); Karthik Narayanan Subramanian, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 132 days.

(21) Appl. No.: 17/182,405

(22) Filed: Feb. 23, 2021

(51) Int. Cl.
| | | |
|---|---|---|
| G01R 31/28 | (2006.01) |
| G01R 31/317 | (2006.01) |
| G01R 31/3177 | (2006.01) |
| G06F 1/04 | (2006.01) |
| H03K 3/037 | (2006.01) |
| G01R 31/3183 | (2006.01) |

(52) U.S. Cl.
CPC ........... *G01R 31/31724* (2013.01); *G01R 31/3177* (2013.01); *G01R 31/318342* (2013.01); *G06F 1/04* (2013.01); *H03K 3/037* (2013.01)

(58) Field of Classification Search
CPC .......... G01R 31/31724; G01R 31/3177; G01R 31/318342; G06F 1/04; H03K 3/037
See application file for complete search history.

(56) References Cited

U.S. PATENT DOCUMENTS

| | | | |
|---|---|---|---|
| 8,862,954 B1* | 10/2014 | Wang ............. | G01R 31/318533 714/731 |
| 2010/0162060 A1* | 6/2010 | Chakravarty .. | G01R 31/318552 714/E11.155 |
| 2010/0251047 A1* | 9/2010 | Tamiya .......... | G01R 31/318558 714/726 |
| 2010/0332928 A1* | 12/2010 | Li .................. | G01R 31/318552 714/E11.155 |
| 2021/0373074 A1* | 12/2021 | Chen ............... | G01R 31/318552 |

* cited by examiner

*Primary Examiner* — Christine T. Tu

(74) *Attorney, Agent, or Firm* — Christopher P. Maiorana, PC

(57) ABSTRACT

An apparatus includes a core logic circuit, one or more integrated clock-gating (ICG) cells, and one or more ICG control cells (ICCs). The core logic circuit generally comprises a plurality of flip-flops. The plurality of flip-flops may be connected to form one or more scan chains. Each of the one or more integrated clock-gating (ICG) cells may be configured to gate a clock signal of a respective one of the one or more scan chains. Each of the one or more ICG control cells may be configured to control a respective one or more of the one or more ICG cells.

20 Claims, 8 Drawing Sheets

UNIFIED APPROACH FOR IMPROVED TESTING OF LOW POWER DESIGNS WITH CLOCK GATING CELLS

FIELD OF THE INVENTION

The invention relates to fault detection generally and, more particularly, to a method and/or apparatus for implementing a unified approach for improved testing of low power designs with clock gating cells.

BACKGROUND

Low power very large scale integration (VLSI) chip design makes extensive use of clock-gating cells to reduce dynamic power consumption. To implement design-for-test (DFT), the clock-gating cells need additional control. A traditional technique for controlling the clock-gating cells is to use automated test equipment (ATE) connected to a dedicated chip input pin to control the clock-gating cells. The traditional approach to controlling the clock-gating cells makes the clock controllable to achieve scan-shifting and allow for capture using a functional enable input of the clock-gating cells. However, the traditional approach reduces available pins and does not work to implement Logic Built-In-Self-Test (LBIST) where all control signals are to be generated inside the chip.

It would be desirable to implement a unified approach for improved ATE and LBIST testing of low power designs with clock gating cells.

SUMMARY

The invention concerns an apparatus comprising a core logic circuit, one or more integrated clock-gating (ICG) cells, and one or more ICG control cells (ICCs). The core logic circuit generally comprises a plurality of flip-flops. The plurality of flip-flops may be connected to form one or more scan chains. Each of the one or more integrated clock-gating (ICG) cells may be configured to gate a clock signal of a respective one of the one or more scan chains. Each of the one or more ICG control cells may be configured to control a respective one or more of the one or more ICG cells.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
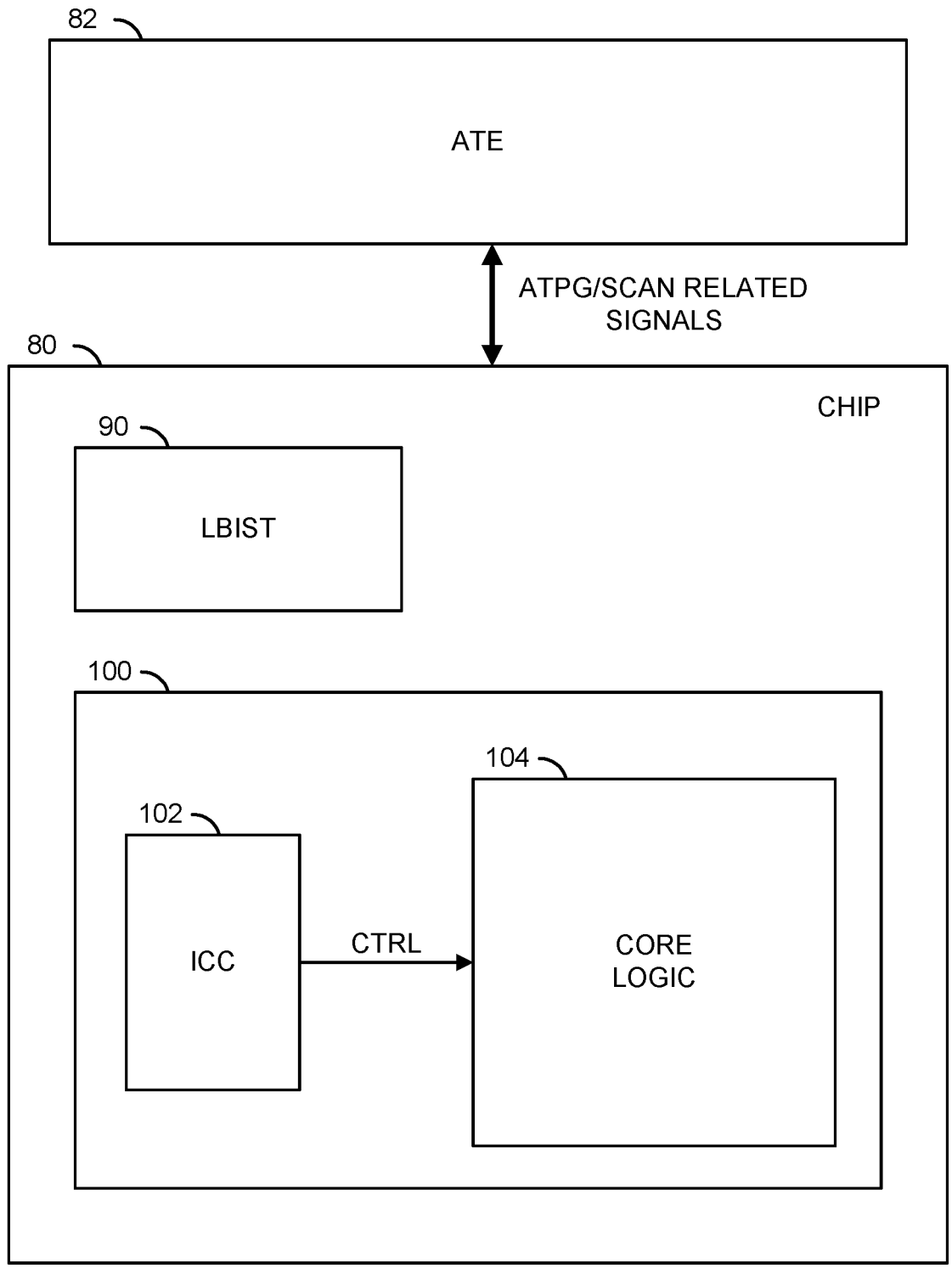
FIG. 1 is a diagram illustrating a design-for-test (DFT) context in which a unified approach in accordance with an example embodiment of the invention may be implemented.

Embodiments of the present invention include providing a unified approach for improved testing of low power designs with clock gating cells that may (i) provide a uniform approach for both automated test pattern generation (ATPG) and Logic Built-In Self Test (LBIST) design-for-test (DFT) techniques, (ii) eliminate need to dedicate one pin to control of integrated clock-gating (ICG) cells, which may be important for low-pin count designs, (iii) implement one or more ICG control cells (ICCs), (iv) provide additional flexibility in terms of hierarchical designs in which the ICCs may be modularly placed, (v) improve test pattern efficiency, (vi) be physical design friendly in avoiding long wires from a single chip level pin, (vii) simplify timing criteria by incorporating one or more ICCs in a design, where each has a respective flip-flop value that does not change during scan-capture, and/or (viii) be implemented as one or more integrated circuits.

In various embodiments, a circuit (or cell) may be implemented to achieve control over one or more integrated clock-gating (ICG) cells and provide flexibility of full control during scan-shift and scan-capture. The circuit may provide logic to enable an integrated clock-gating cell during scan-shift for clock propagation. The circuit may also provide an ability for an automatic test pattern generation (ATPG) tool to control the clock-gating cell depending on capture criteria. In various embodiments, an approach is generally provided that achieves a uniform solution when implementing both ATPG and Logic Built-In Self Test (LBIST). The approach may also provide additional performance improvements when implemented in multiple hierarchical blocks.

Clock gating cells are added as part of a synthesis process during a design flow for low power digital circuits. In an example, a synthesis tool converts a low power circuit design abstraction using a hardware description language (e.g., register-transfer level (RTL), etc.) into flip-flops, latches, and/or combinational logic. An RTL design abstraction models a synchronous digital circuit in terms of (i) a flow of digital signals (data) between hardware registers and (ii) one or more logical operations performed on those signals. The synthesis tool also inserts clock-gating cells on groups of flip-flops to turn off the clock when there is no activity. Turning off the clock during periods of no activity generally reduces dynamic power demands in a synchronous circuit design. To reduce a timing impact and avoid glitching of clocks during enable/disable, synthesis tools use an "integrated clock-gating (ICG) cell" to implement clock gating. Most foundry libraries have ICG cells available as standard cells to be used for clock gating. Due to the automation provided by synthesis tools, designs that are geared towards low power applications typically have a large number of ICG cells.

The chip manufacturing process is prone to defects, which are commonly referred to as faults. A fault is testable if there exists a well-specified procedure to expose the fault in the actual silicon. To facilitate the task of detecting as many faults as possible in a design, additional logic needs to be added. Design-for-test (also referred to as design for testability) generally refers to design techniques that make the task of testing feasible. The common design-for-test (DFT) techniques for logic test generally include Scan and automatic test pattern generation (ATPG). The integrated clock-gating cells generally create a challenge for implementing design-for-test (DFT) features like Scan.

The Scan technique generally involves connecting flip-flops in a design into a serial chain (e.g., called a scan chain) so data may be shifted in and shifted out. Scan is an important test feature that needs to be implemented to generate patterns for manufacturing testing to screen out real chips with manufacturing defects. To implement Scan, clock inputs of the flip-flops of a design need to be directly controlled by a clock supplied by the automatic test equipment (ATE) to one or more on-chip pins. The integrated clock-gating (ICG) cells generally create a challenge for this clock control. For traditional DFT techniques like Scan and ATPG, a common approach is to control a scan-enable (SE) input of ICG cells from the one or more on-chip pins. The common approach allows control from the ATE to enable the ICG cells during scan-shift and have control during scan-capture. However, the common approach does not scale well and also cannot be used for Logic Built-in Self Test (LBIST), where all control needs to be internal to the chip.

In various embodiments, a circuit (e.g., an ICG control cell (ICC)) may be added into a design. The ICG control cell generally allows full control of the clock during shift and provides flexibility to get coverage on functional logic feeding a functional enable (FE) input of one or more ICG cells. A flip-flop within the ICC may be stitched as part of a regular scan chain. This gives an ability for an ATPG tool to set the flip-flop to either a logic LOW (e.g., 0) or a logic HIGH (e.g., 1) during a pattern generation process. A logic gate (e.g., an OR gate) included within the ICC and controlled by a scan-enable (SE) signal generally ensures that the one or more ICG cells are always enabled during the scan-shift process (e.g., when the scan-enable signal is a logic HIGH or 1). After scan shifting is done (e.g., the scan-enable signal goes from logic HIGH or 1 to a logic LOW or 0), the SE input of the one or more ICG cells is generally controlled by the value in the flip-flop within the ICC. Since the flip-flop within the ICC is part of the scan-chain, the flip-flop within the ICC may also be set by pseudo random pattern generation (PRPG) during LBIST testing.

Referring to FIG. 1, a diagram is shown illustrating a design-for-test (DFT) context in which a unified approach in accordance with an example embodiment of the invention may be implemented. In various embodiments, a circuit 100 may implement a circuit design comprising one or more circuits (or modules or cores) comprising one or more integrated clock-gating (ICG) cells. The circuit 100 may further implement one or more ICG control cells (ICCs) in accordance with an embodiment of the invention to allow control of the one or more ICG cells during circuit test procedures. In an example embodiment, the circuit 100 may comprise a block (or circuit) 102 and a block (or circuit) 104. The circuit 102 may implement an integrated clock-gating (ICG) control cell (ICC) in accordance with an example embodiment of the invention. The circuit 104 may implement a core logic portion of the circuit 100. In various embodiments, the circuit 104 generally includes one or more synchronous digital circuits (or modules) in which a clock is to be turned off during periods of inactivity.

In various embodiments, the circuit 100 may be instantiated on an integrated circuit die (or chip) 80. In some embodiments, the integrated circuit die 80 may implement a System-on-Chip (SoC). In some embodiments, automated test equipment (ATE) 82 may be connected to the circuit 100 to perform various automated tests. In an example, the ATE 82 may present a number of signals to the circuit 100 and receive a number of signals from the circuit 100. In an example the signals presented to the circuit 100 by the ATE 82 may comprise test patterns (e.g., ATPG, PRPG, etc.) and/or Scan related signals generated by the ATE 82. In an example, the test patterns may be generated by an automatic test pattern generation (ATPG) circuit of the ATE 82. In an example, the signals received by the ATE 82 from the circuit 100 may comprise scan-capture results (data). In some embodiments, the integrated circuit die 80 may further comprise a logic built-in self test (LBIST) circuit 90. The LBIST circuit 90 may be configured to test the circuit 100 using signals generated internally within the chip 80. In various embodiments, the circuit 100 generally implements a unified approach for improved ATE and LBIST testing of low power designs with clock-gating cells in accordance with an example embodiment of the invention.

In various embodiments, the circuit 102 may implement one or more ICG control cells (ICCs) in accordance with an embodiment of the invention. The circuit 104 may implement a low power circuit design including one or more integrated clock-gating (ICG) cells. The circuit 102 may be coupled to the circuit 104. In an example, the circuit 102 may have an output that may present a signal (e.g., CTRL) to an input of the circuit 104. The signal CTRL may be configured to control the one or more integrated clock-gating cells of the circuit 104.

Figure 2:
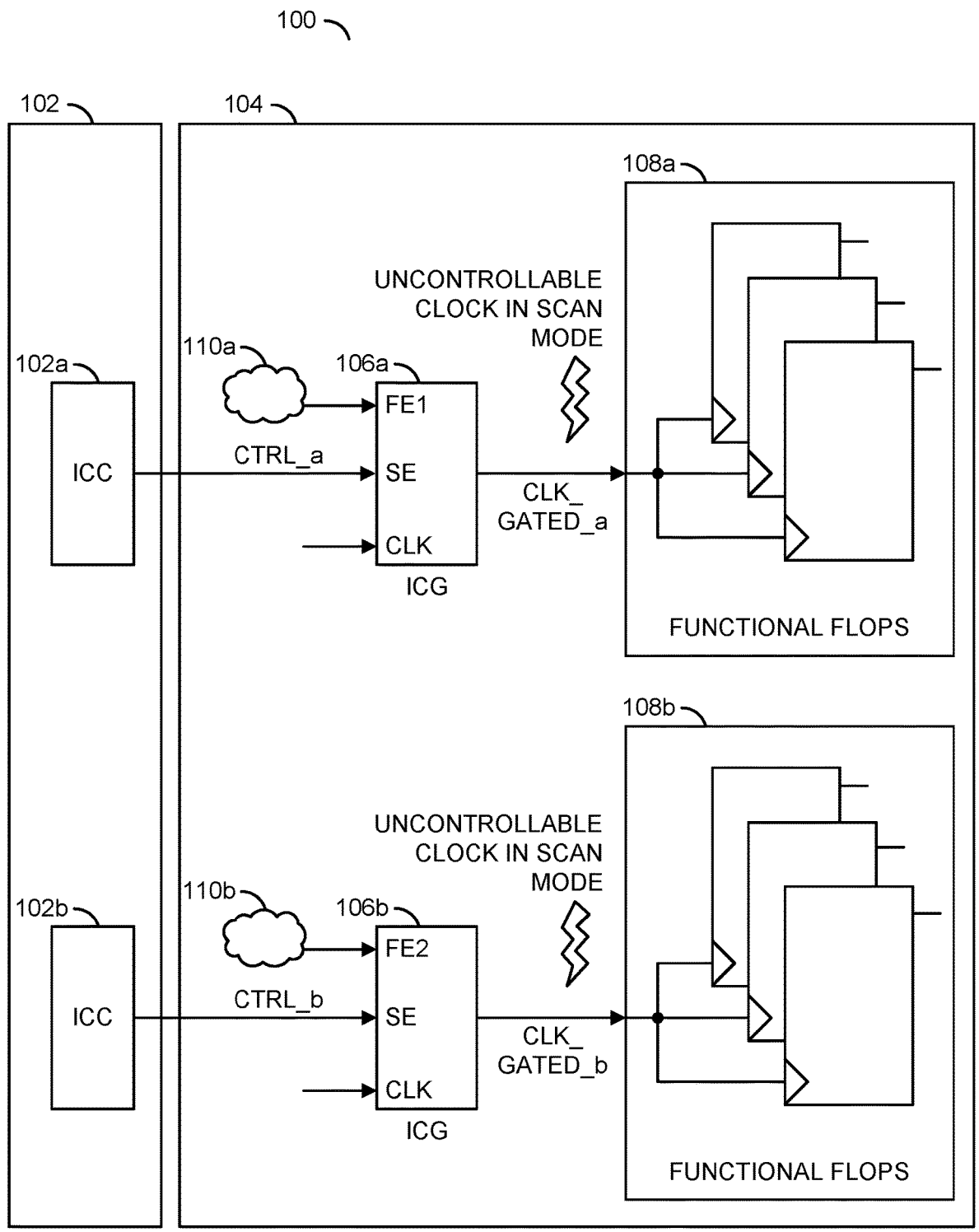
FIG. 2 is a diagram illustrating an example implementation of a circuit implementing a unified approach in accordance with an example embodiment of the invention.

Referring to FIG. 2, a diagram is shown illustrating an example implementation of the circuit 100. In an example, the circuit 102 may comprise a block (or circuit) 102a and a block (or circuit) 102b. Each of the blocks 102a and 102b may implement an ICG control cell (ICC) in accordance with an example embodiment of the invention. In an example, the circuit 102a may be configured to generate a first signal (e.g., CTRL_a) and the circuit 102b may be configured to generate a second signal (e.g., CTRL_b). In an example, the signals CTRL_a and CTRL_b may be used to make a clock (or multiple clocks) of the circuit 104 controllable to achieve scan shifting and to allow for scan capture using a functional enable input of ICG cells in the circuit 104.

In an example, the circuit 104 may comprise a first block (or circuit) 106a, a second block (or circuit) 106b, a third block (or circuit) 108a, a fourth block (or circuit) 108b, a fifth block (or circuit) 110a, and a sixth block (or circuit) 110b. Each of the circuits 106a and 106b may implement an integrated clock-gating (ICG) cell. The integrated clock-gating cells 106a and 106b may be implemented using conventional techniques. Each of the circuits 108a and 108b may implement a plurality of functional flip-flips. Each of the circuits 110a and 110b may implement circuitry (e.g., combinatorial logic, etc.) of the circuit 104. The circuit 108a, 108b, 110a, and 110b may be implemented using conventional techniques.

The circuit 110a may have an output that may present a signal (e.g., FE1) to a first input of the circuit 106a. The circuit 110b may have an output that may be present a signal (e.g., FE2) to a first input of the circuit 106b. The circuit 106a may have a second input that may receive the signal CTRL_a from the circuit 102a. The circuit 106b may have a second input that may receive the signal CTRL_b from the circuit 102b. The circuit 106a may have a third input that may receive a system clock signal (e.g., CLK). The circuit 106b may have a third input that may receive the system clock signal CLK. The signals FE1 and FE2 may comprise functional enable signals generated by the circuitry of the circuits 110a and 110b, respectively.

The circuit 106a may have an output that may present a signal (e.g., CLK_GATED_a) to an input of the circuit 108a. The signal CLK_GATED_a presented by the circuit 106a to the circuit 108a may comprise a clock signal that is typically uncontrollable in a scan mode. The circuit 106b may have an output that may present a signal (e.g., CLK_GATED_b) to an input of the circuit 108b. The signal CLK_GATED_b presented by the circuit 106b to the circuit 108b may comprise a clock signal that is typically uncontrollable in the scan mode. The signal CLK_GATED_a presented to the circuit 108a may be presented to a clock input of each of the functional flip-flops of the circuit 108a. The signal CLK_GATED_a from the circuit 106a may implement a gated clock signal. The signal CLK_GATED_b presented to the circuit 108b may be presented to a clock input of each of the functional flip-flops of the circuit 108b. The signal CLK_GATED_b from the circuit 106b may implement a gated clock signal.

Figure 3:
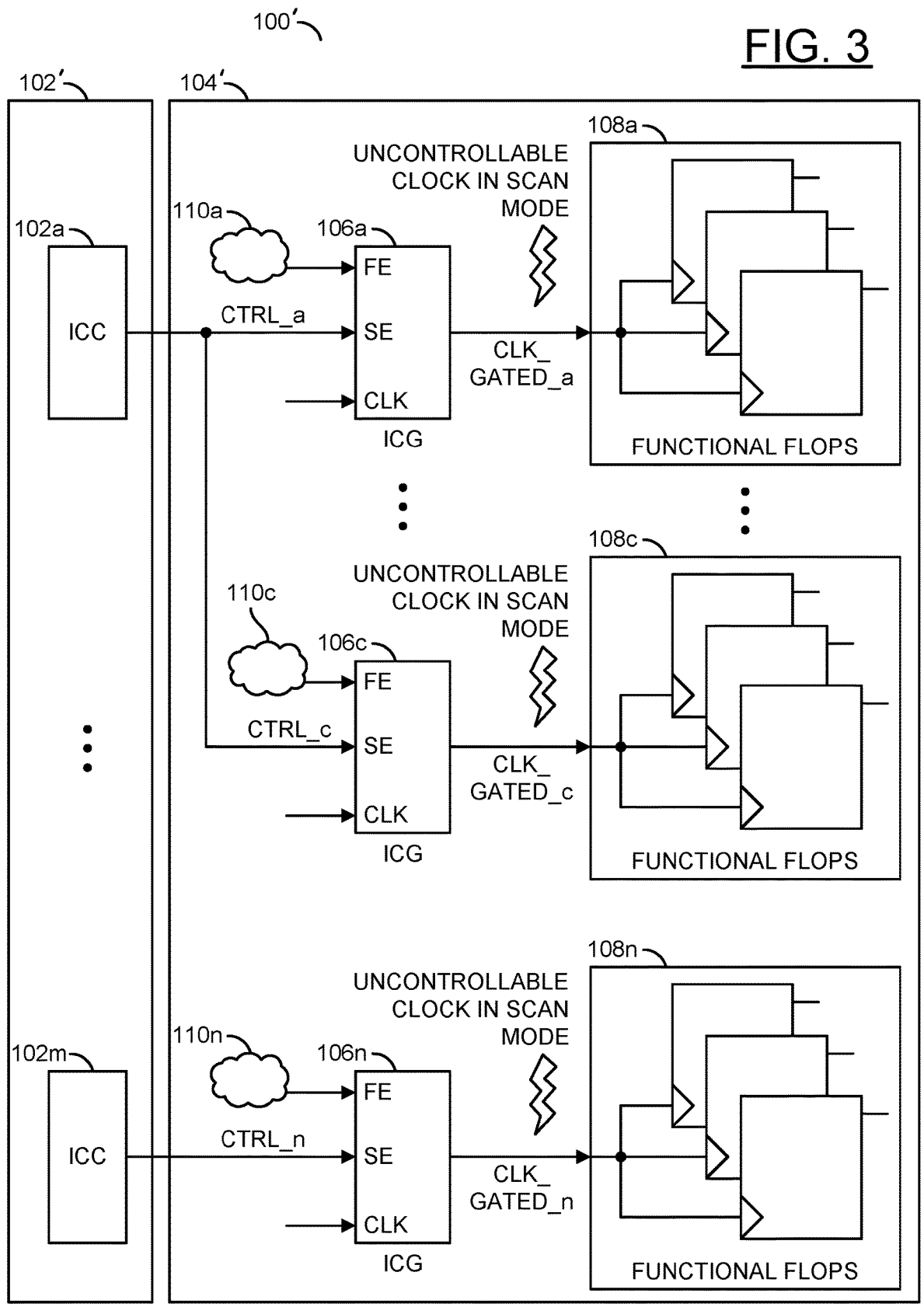
FIG. 3 is a diagram illustrating another example implementation of a circuit implementing a unified approach in accordance with an example embodiment of the invention.

Referring to FIG. 3, a diagram is shown illustrating another example implementation of a circuit/logic implementing a unified approach in accordance with an example embodiment of the invention. In some embodiments, a number of ICCs implemented may be lower than a number ICG cells in a circuit (chip). In an example, a circuit 100' may comprise a circuit 102' and a circuit 104'. In an example, the circuit 102' may comprise a number (e.g., M) of blocks (or circuits) 102a-102m. Each of the blocks (or circuits) 102a-102m may implement an ICG control cell (ICC) in accordance with an example embodiment of the invention. In an example, the circuits 102a-102m may be configured to generate a number of signals (e.g., CTRL_a, . . . , CTRL_m). In an example, the signals CTRL_a-CTRL_m may be used to make a clock of the circuit 104' controllable to achieve scan shifting and to allow for scan capture using a functional enable input of one or more ICG cells in the circuit 104'.

In an example, the circuit 104' may comprise a number (e.g., N) of blocks (or circuits) 106a-106n and N blocks (or circuits) 108a-108n. The blocks 106a-106n and 108a-108n may be implemented similarly to the blocks of similar number in FIG. 2. Each of the blocks (or circuits) 106a-106m may implement an integrated clock-gating (ICG) cell. The integrated clock-gating cells 106a-106m may be implemented using conventional techniques. Each of the blocks 108a-108n may implement a plurality of functional flip-flips. The circuit 104' may also comprise N blocks 110a-110n (e.g., connected similarly to the blocks 110a and 110b in FIG. 2), which may implement circuitry (e.g., combinatorial logic, etc.) of the circuit 104'. The blocks 108a-108n and 110a-110n may be implemented using conventional techniques.

In an example, the number M may be smaller than the number N. In an example, the signal CTRL_a from the block 102a may be presented to scan-enable (SE) inputs of a group of ICG cells (e.g., blocks 106a-106c), a signal CTRL_m from the block 102m may be presented to a scan-enable (SE) input of a single ICG cell (e.g., block 106n), and signals CTRL_b-CTRL_m-1 may be presented to various combinations of the blocks 106d-106(n-1) (not shown for clarity of illustration). The circuits 106a-106n may also have an input that may receive respective functional enable signals (e.g., FE1, FE2, . . . , FEn) and a clock input that may receive a system clock signal (e.g., CLK).

The circuit 106a may have an output that may present a signal (e.g., CLK_GATED_a) to an input of the circuit 108a. The signal CLK_GATED_a presented by the circuit 106a to the circuit 108a may comprise a clock signal that is uncontrollable in a scan mode. The circuit 106c may have an output that may present a signal (e.g., CLK_GATED_c) to an input of the circuit 108c. The signal CLK_GATED_c presented by the circuit 106c to the circuit 108c may comprise a clock signal that is uncontrollable in the scan mode. The circuit 106n may have an output that may present a signal (e.g., CLK_GATED_n) to an input of the circuit 108n. The signal CLK_GATED_n presented by the circuit 106n to the circuit 108n may comprise a clock signal that is uncontrollable in the scan mode. The circuit 106b and 106d-106(n-1) may be configured similarly.

The signal CLK_GATED_a presented to the circuit 108a may be presented to a clock input of each of the functional flip-flops of the circuit 108a. The signal CLK_GATED_a from the circuit 106a may implement a gated clock signal. The signal CLK_GATED_c presented to the circuit 108c may be presented to a clock input of each of the functional flip-flops of the circuit 108c. The signal CLK_GATED_c from the circuit 106c may implement a gated clock signal. The signal CLK_GATED_n presented to the circuit 108n may be presented to a clock input of each of the functional flip-flops of the circuit 108n. The signal CLK_GATED_n from the circuit 106n may implement a gated clock signal. Signal CLK_GATED_b and CLK_GATED_d-CLK_GATED (n-1) may be utilized similarly.

Figure 4:
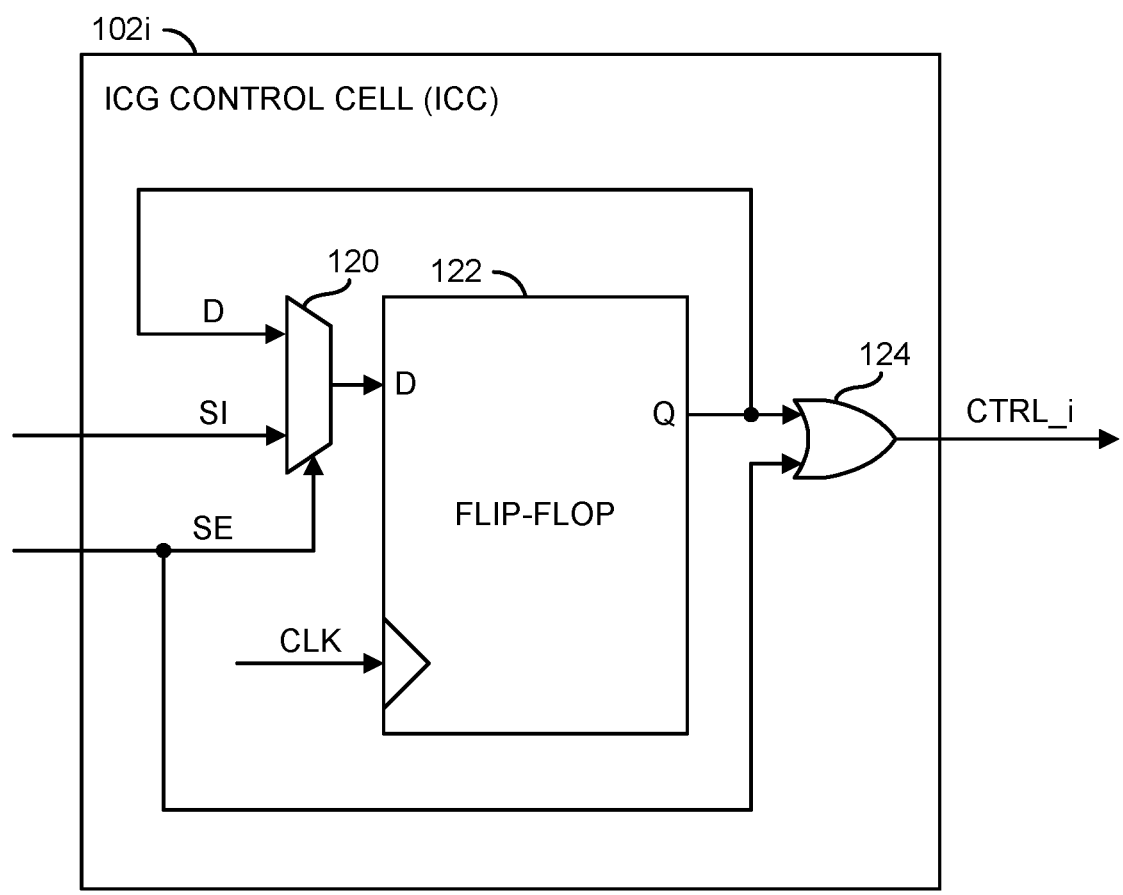
FIG. 4 is a diagram illustrating an example implementation of an integrated clock-gating (ICG) control cell (ICC) in accordance with an example embodiment of the invention.

Referring to FIG. 4, a diagram of a circuit 102i is shown illustrating an example implementation of an ICG control cell (ICC) in accordance with an example embodiment of the invention. The circuit 102i is generally representative of the circuits 102a and 102b of FIGS. 2 and 102a-102m of FIG. 3. In an example, the circuit 102i may comprise a first block (or circuit) 120, a second block (or circuit) 122, and a third block (or circuit) 124. The block 120 may implement a multiplexer circuit. The block 122 may implement a positive edge-triggered flip-flop circuit. The block 124 may implement a logic gate. In one example, the logic gate 124 may be implemented as an OR gate. In an example, the flip-flop 122 may be implemented as a positive edge-triggered D-type flip-flop. However other types of logic gates and flip-flops may be implemented to meet design criteria of a particular implementation.

In an example, a signal (e.g., SI) may be presented to a first input of the multiplexer circuit 120, a signal (e.g., SE) may be presented to a control input of the multiplexer circuit 120 and a first input of the logic gate 124. The signal SI may comprise a scan shift-in signal. The signal SE may comprise a scan-enable signal. An output of the multiplexer circuit 120 may be presented to a data input of the flip-flop 122. A clock signal (e.g., CLK) may be presented to a clock input of the flip-flop 122. An output of the flip-flop 122 may be presented to a second input of the multiplexer circuit 120 and a second input of the logic gate 124. An output of the logic gate 124 may present a signal (e.g., CTRL_i). The signal CTRL_i may be presented as an output of the circuit 102i.

In various embodiments, the flip-flop 122 within the ICC 102i may be stitched as part of a scan chain. Stitching the flip-flop 122 within the ICC 102i provides an ability for an ATPG tool to set the flip-flop 122 to either a logic LOW (e.g., 0) or a logic HIGH (e.g., 1) during a pattern generation process. The logic gate 124 within the ICC 102i generally ensures that an ICG cell controlled by the ICC 102i is always enabled during the scan-shift process (e.g., when a level of the scan-enable signal is a logic HIGH or 1). After scan shifting is done (e.g., the level of the scan-enable signal goes from logic HIGH or 1 to a logic LOW or 0), the SE input of the ICG cell controlled by the ICC 102i is generally controlled by the value in the flip-flop 122 within the ICC 102i. Since the flip-flop 122 within the ICC 102i is part of the scan-chain, the flip-flop 122 within the ICC 102i may also be set by pseudo random pattern generation (PRPG) during LBIST testing.

Figure 5:
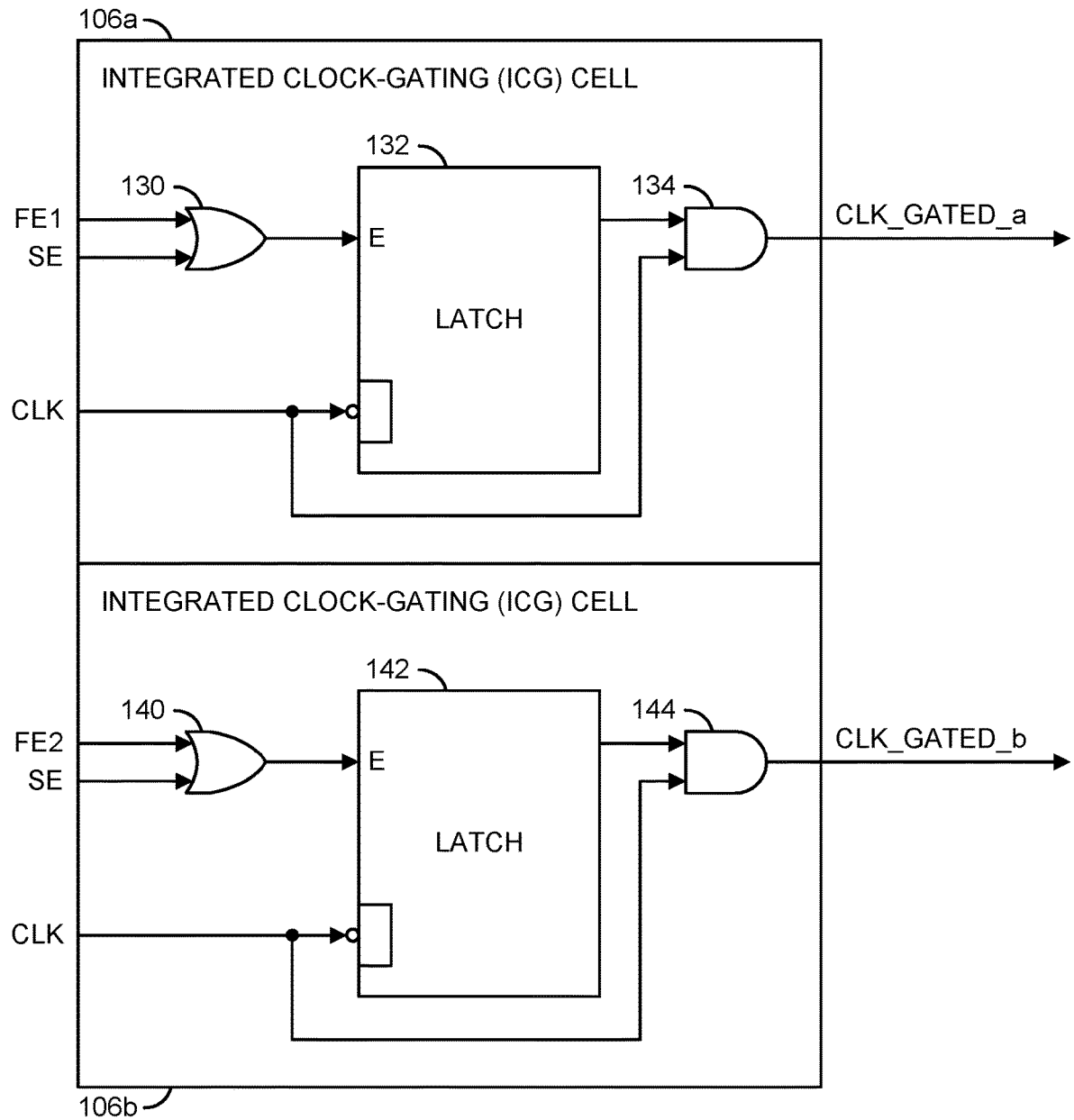
FIG. 5 is a diagram illustrating an example implementation of an integrated clock-gating cell of FIG. 2.

Referring to FIG. 5, a diagram is shown illustrating an example implementation of the circuits 106a and 106b of FIG. 2. In an example, the circuits 106a and 106b may each implement an integrated clock-gating (ICG) cell. The circuit 106a may comprise a first logic gate 130, a first latch 132, and a second logic gate 134. The circuit 106b may comprise a third logic gate 140, a second latch 142, and a fourth logic gate 144. In an example, the logic gates 130 and 140 may be implemented as OR gates. In an example, the logic gates 134 and 144 may be implemented as AND gates. In an example, the latches 132 and 142 may be implement as negative level-sensitive D-type latches. However, other types of logic gates and latches may be implemented to meet design criteria of a particular implementation. For example, the logic gates 134 and 144 may be implemented as an OR type clock gate by implementing the latches 132 and 142 as positive level-sensitive latches and changing the logic gates 130 and 140 to NOR gates.

A functional enable input (e.g., FE1) of the circuit 106a may be connected to a first input of the logic gate 130. A scan enable input (e.g., SE) of the circuit 106a may be connected to a second input of the logic gate 130. The FE1 input may receive a functional enable signal generated by the core circuitry 110a. The SE input may receive the signal CTRL_a generated by the circuit 102a. In the example shown, a clock signal (e.g., CLK) may be presented to a negative level-sensitive input of the circuit 132. An output of the logic gate 130 may be presented to a conditional (or enable) input of the latch 132. An output of the latch 132 may be presented to a second input of the logic gate 134. An output of the logic gate 134 may present the signal CLK_GATED_a.

A functional enable input (e.g., FE2) of the circuit 106b may be connected to a first input of the logic gate 140. A scan enable input (e.g., SE) of the circuit 106b may be connected to a second input of the logic gate 140. The FE2 input may receive a functional enable signal generated by the core circuitry 110b. The SE input may receive the signal CTRL_b generated by the circuit 102b. In the example shown, the clock signal CLK may be presented to a negative level-sensitive input of the circuit 142. An output of the logic gate 140 may be presented to a conditional (or enable) input of the latch 142. An output of the latch 142 may be presented to a second input of the logic gate 144. An output of the logic gate 144 may present the signal CLK_GATED_b.

Figure 6:
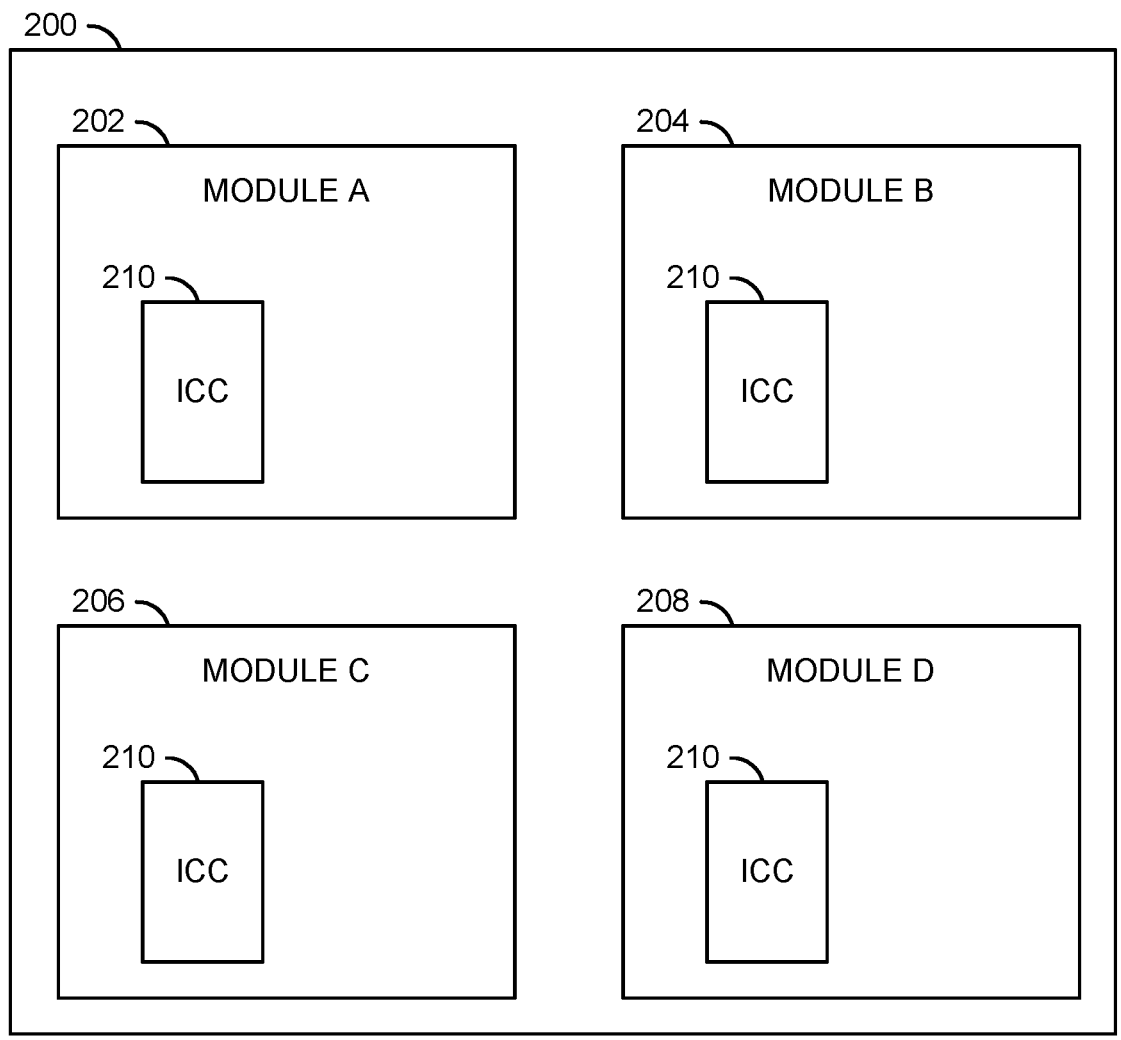
FIG. 6 is a diagram illustrating a circuit implementing a hierarchical design with modularly placed ICCs in accordance with another example embodiment of the invention.

Referring to FIG. 6, a diagram is shown illustrating a circuit implementing a hierarchical design with modularly placed ICCs in accordance with another example embodiment of the invention. In an example, an integrated circuit 200 may comprise a plurality of circuit modules (e.g., 202, 204, 206, and 208). Although four modules are shown, any number of modules may be implemented accordingly to meet design criteria of a particular implementation. In an example, each of the modules 202-208 may be implemented as an independent circuit core. In an example, each of the modules 202-208 may incorporate one or more ICG control cell (ICCs) 210 in accordance with an example embodiment of the invention. The ICCs 210 may be implemented similarly to the ICC 102i describe above in connection with FIG. 4. When a design has multiple large design modules, separate ICCs 210 may be implemented in each design module as shown in FIG. 6. The separate ICCs 210 generally give an ATPG tool more freedom in controlling ICG cells in each of the modules 202-208. For example, ICG cells in the circuit module 202 may be controlled differently than ICG cells in the circuit module 204, improving test pattern efficiency.

Figure 7:
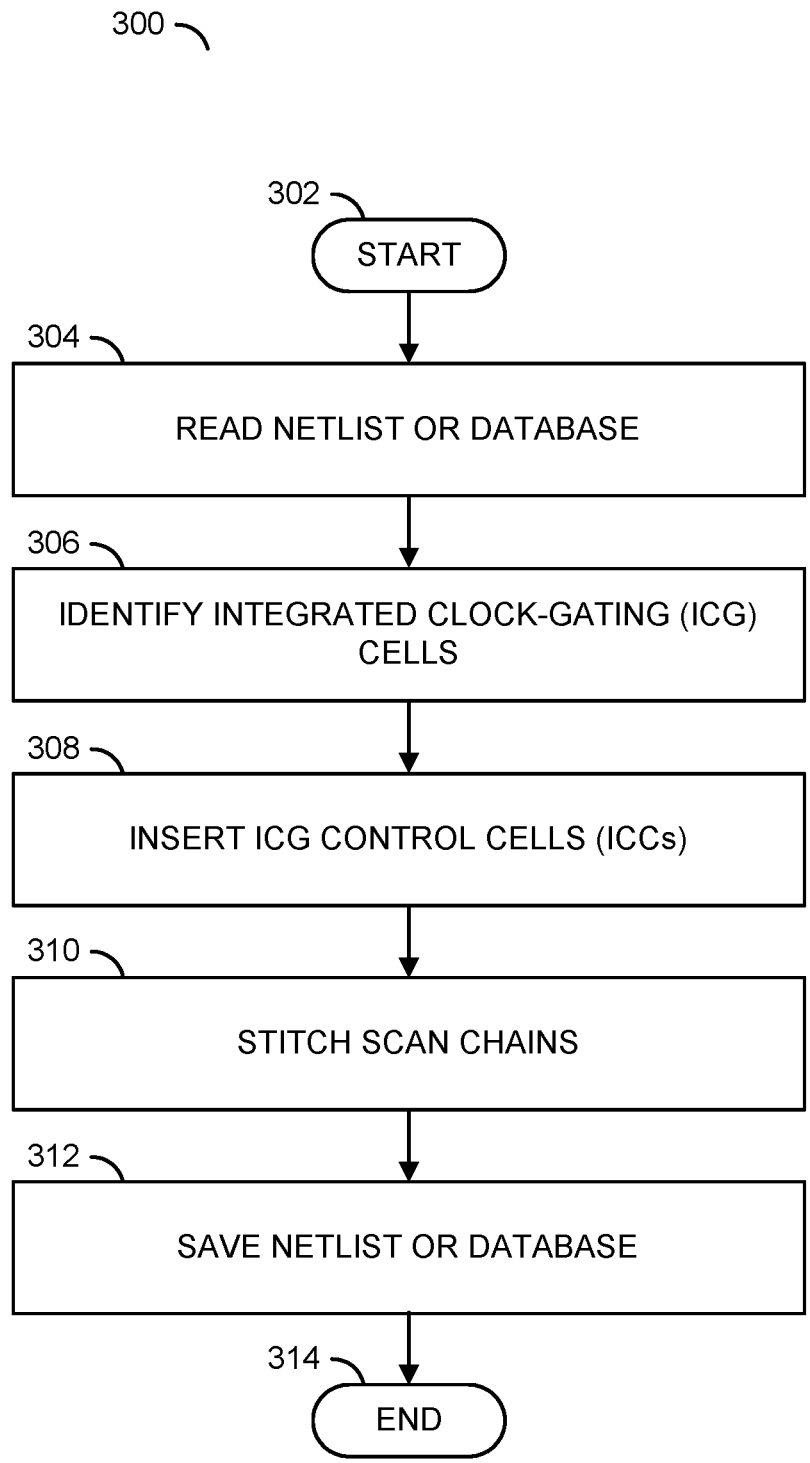
FIG. 7 is a flow diagram illustrating an example process in accordance with an example embodiment of the invention.

Referring to FIG. 7, a flow diagram is shown illustrating a process in accordance with an example embodiment of the invention. In an example, a process (or method) 300 may be implemented to insert one or more ICG control cells into a predefined circuit design. In an example, the process 300 may comprise a step (or state) 302, a step (or state) 304, a step (or state) 306, a step (or state) 308, a step (or state) 310, a step (or state) 312, and a step (or state) 314. The process 300 may begin in the step 302 and move to the step 304. In the step 304, the process 300 may read a netlist or database describing a circuit design comprising one or more integrated clock-gating cells from a computer readable storage medium (e.g., memory, hard drive, optical drive, cloud storage, etc.). In the step 306, the process 300 may identify one or more integrated clock-gating cells within one or more scan chains of the design. When the one or more integrated clock-gating cells and scan chains of the design have been identified, the process 300 may move to the step 308.

In the step 308, the process 300 may insert one or more ICG control cells (ICCs) implemented in accordance with an embodiment of the invention. Depending on the circuit design, the process 300 may insert an ICC in front of each of the integrated clock-gating cells of the design, insert a single ICC in front of all the ICG cells of a block or module, and/or divide the ICG cells in a block or module of the design into a number of groups with each group having a respective ICC. When the one or more ICG control cells (ICCs) have been inserted, the process 300 may move to the step 310. In the step 310, the process may stitch together flip-flops of the one or more ICCs and the one or more scan chains of the design. The flip-flops of the one or more ICCs and the one or more scan chains of the design may be stitched using conventional techniques. In the step 312, the process 300 may save the modified netlist or database back to the same or a different storage medium and move to the step 314. In the step 314, the process 300 may terminate.

Figure 8:
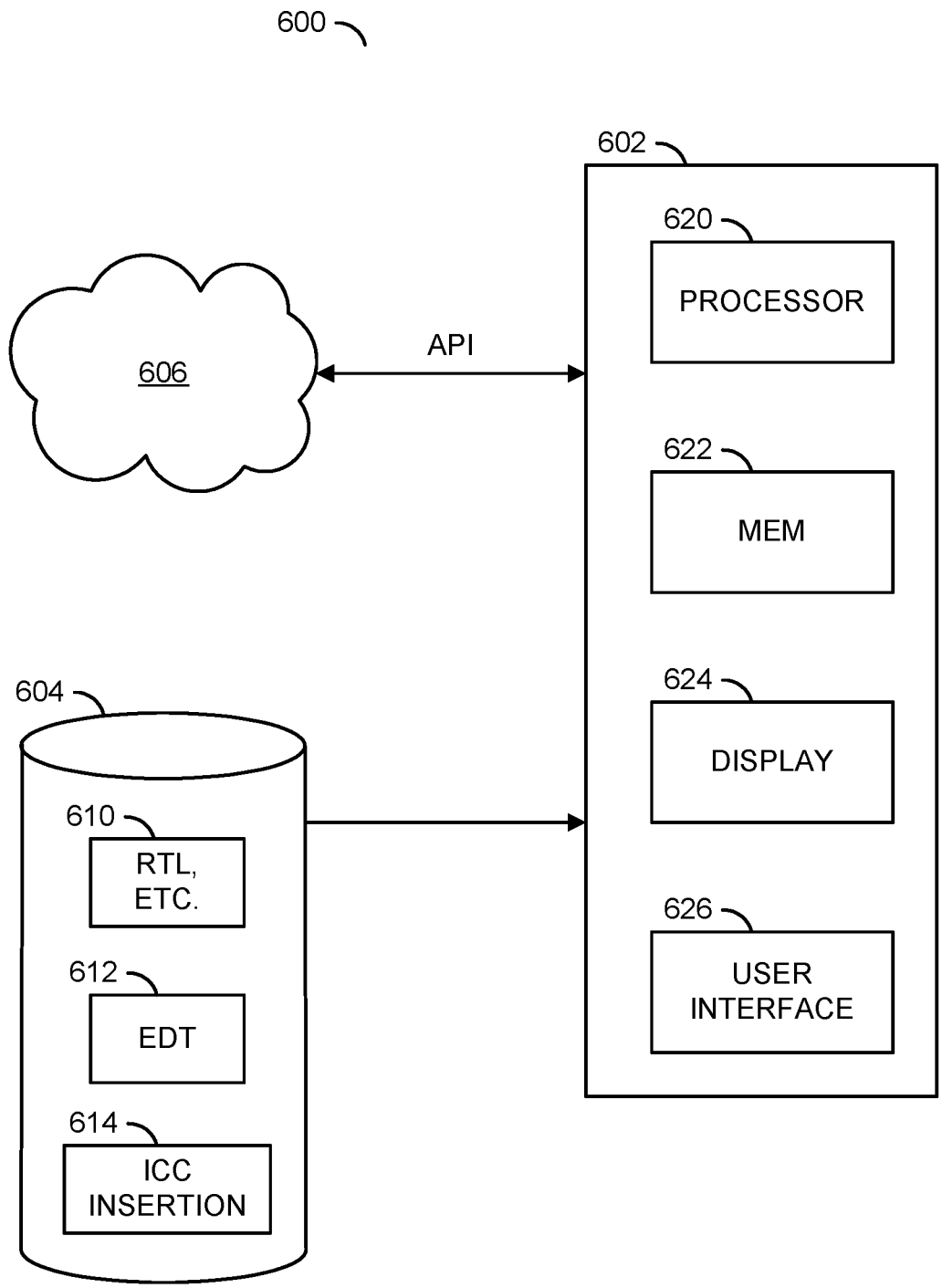
FIG. 8 is a diagram illustrating an example of a computer system in which a process in accordance with an example embodiment of the invention may be implemented.

Referring to FIG. 8, a diagram is shown illustrating a context in which a process in accordance with an example embodiment of the invention may be implemented. In an example, a system 600 may be configured (e.g., through software) to perform the process 300 in accordance with an example embodiment of the invention described above in connection with FIG. 6. In an example, the system 600 may comprise a computer 602 and a computer readable storage medium 604. In an example, the computer 602 may be implemented as a general purpose computer system. In an example, the computer readable storage medium 604 may comprise non-volatile media including, but not limited to, a magnetic storage medium (e.g., a hard disk drive or HDD), an optical storage medium (e.g., compact disc (CD), digital video disc (DVD), BluRay disc (BD), a solid state drive (SSD), Flash memory, and/or a network associated storage system (NAS). In an example, the computer 602 and the computer readable storage medium 604 may be coupled together to exchange programs and data. In an example, the computer 602 may also be coupled together to exchange programs and data with cloud based resources 606. In an example, a program (or programs) 610 implementing a design of an electronic circuit may be stored on the computer readable storage medium 604 or in cloud based resources 606. In an example, a program (or programs) 612 implementing one or more electronic design tools (EDT) or electronic design automation (EDA) suites may be stored on the computer readable storage medium 604 or in cloud based resources 608. In an example, a program (or programs) 614 implementing the process 300 (described above in connection with FIG. 6) may be stored on the computer readable storage medium 604 or in cloud based resources 608. In an example, the computer 602 may be further configured to perform the ICC insertion process in accordance with an example embodiment of the invention utilizing the cloud based resources 608. In an example, the computer 602 may be configured to perform the program (or programs) 614 implementing the ICC insertion process in accordance with an example embodiment of the invention via one or more application program interfaces (APIs).

In an example, the computer 602 may include, but is not limited to, a processor 620, memory 622, a display 624, and a user interface 626. In various embodiments, the processor 620 may include, but is not limited to, a central processing unit (CPU), a graphics processing unit (GPU), and a video processing unit (VPU). In various embodiments, the memory 622 may include, but is not limited to, random access memory (e.g., SRAM, DRAM, FLASH, etc.), read only memory (ROM), and cache memory. The display 624 and the user interface 626 generally allow a user to initiate and monitor the computer 602 performing the program (or programs) 614 implementing the ICC insertion process in accordance with an example embodiment of the invention.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a core logic circuit comprising one or more scan chains;
   one or more integrated clock-gating (ICG) cells, each configured to present a gated clock signal to a respective one of said one or more scan chains; and
   one or more ICG control cells, each configured to present a test enable signal to a respective one or more of said one or more ICG cells, wherein each of said one or more ICG control cells comprises a flip-flop and is further configured to (a) select between an output of said flip-flop and a shift-in signal of said respective one of said one or more scan chains for presentation to an input of said flip-flop based on a shift enable signal of said respective one of said one or more scan chains, (b) update said output of said flip-flop with said input of said flip-flop based on a clock signal of said respective one of said one or more scan chains, and (c) generate said test enable signal based on said output of said flip-flop and said shift enable signal of said respective one of said one or more scan chains.

2. The apparatus according to claim 1, wherein each of said one or more ICG control cells is configured to provide control during scan-shift and scan-capture.

3. The apparatus according to claim 1, wherein each of said one or more ICG control cells is configured to provide logic to allow an automated test pattern generation (ATPG) tool to control the respective one or more ICG cells based on predetermined capture criteria.

4. The apparatus according to claim 1, wherein each of said one or more ICG control cells is configured to facilitate control of said one or more ICG cells by one or both of automated test pattern generation (ATPG) and Logic Built-In Self Test (LBIST) techniques.

5. The apparatus according to claim 1, wherein:
   each of said one or more ICG control cells further comprises a multiplexer circuit and a logic gate;
   an output of said multiplexer circuit is connected to the input of said flip-flop;
   the output of said flip-flop is connected to a first input of said multiplexer circuit and a first input of said logic gate;
   the shift-in signal of the respective one of said one or more scan chains is presented to a second input of said multiplexer circuit;
   the shift enable signal of the respective one of said one or more scan chains is presented to a control input of said multiplexer circuit and a second input of said logic gate;
   the gated clock signal of the respective one of said one or more scan chains is presented to a clock input of said flip-flop; and
   the test enable signal is presented at an output of said logic gate.

6. The apparatus according to claim 1, wherein each integrated clock-gating (ICG) cell is controlled by a respective ICG control cell.

7. The apparatus according to claim 1, wherein one or more groups of integrated clock-gating (ICG) cells are each controlled by a respective ICG control cell.

8. The apparatus according to claim 1, wherein said core logic circuit comprises a plurality of circuit modules and integrated clock-gating (ICG) cells of each circuit module are controlled by a respective ICG control cell.

9. The apparatus according to claim 8, wherein said plurality of circuit modules are part of a hierarchical circuit design.

10. The apparatus according to claim 1, further comprising a logic built-in self test circuit connected to said one or more ICG control cells.

11. A method of providing control over integrated clock-gating (ICG) cells comprising:
    reading a netlist or database defining a core logic circuit comprising a plurality of first flip-flops from a computer readable storage medium, wherein said plurality of first flip-flops are connected to form one or more scan chains;
    identifying one or more integrated clock-gating (ICG) cells, each configured to present a gated clock signal to a respective one of said one or more scan chains;
    inserting one or more ICG control cells, each configured to present a test enable signal to a respective one or more of said one or more ICG cells, wherein each of said one or more ICG control cells comprises a second flip-flop and is further configured to (a) select between an output of said second flip-flop and a shift-in signal of said respective one of said one or more scan chains for presentation to an input of said second flip-flop based on a shift enable signal of said respective one of said one or more scan chains, (b) update said output of said second flip-flop with said input of said second flip-flop based on a clock signal of said respective one of said one or more scan chains, and (c) generate said test enable signal based on said output of said second flip-flop and said shift enable signal of said respective one of said one or more scan chains;
    stitching said second flip-flops of the one or more ICG control cells and said first flip-flops associated with each of the one or more scan chains; and
    saving a modified version of the netlist or database to the same or a different computer readable storage medium.

12. The method according to claim 11, wherein each of said one or more ICG control cells provides control for both an automated test pattern generation (ATPG) tool and Logic Built-In Self Test (LBIST).

13. The method according to claim 11, wherein each of said one or more ICG control cells is inserted prior to a respective integrated clock-gating (ICG) cell.

14. The method according to claim 11, wherein each of said one or more ICG control cells is configured to control a groups of integrated clock-gating (ICG) cells.

15. The method according to claim 11, further comprising identifying a plurality of circuit modules within said core logic circuit and inserting respective ICG control cells to control integrated clock-gating (ICG) cells of each circuit module.

16. The method according to claim 11, wherein said netlist or database further defines a logic built-in self test circuit.

17. A method of controlling one or more integrated clock-gating (ICG) cells in a circuit comprising:
    using a multiplexer circuit to select between an output of a flip-flop and a shift-in signal of a scan chain based on a shift enable signal of said scan chain;
    presenting an output of said multiplexer circuit to a data input of said flip-flop;
    presenting a clock signal to a clock input of said flip-flop; and
    using a logic gate to generate a test enable signal for said one or more integrated clock-gating (ICG) cells in said circuit in response to said output of said flip-flop and said shift enable signal of said scan chain.

18. The method according to claim 17, wherein said clock signal is presented also to said one or more integrated clock-gating (ICG) cells.

19. The method according to claim 18, wherein said one or more integrated clock-gating (ICG) cells generate a gated clock signal for said scan chain based on said clock signal and said test enable signal.

20. The method according to claim 18, wherein said one or more integrated clock-gating (ICG) cells generate a gated clock signal for said scan chain based on said clock signal, said test enable signal, and a functional enable signal.

* * * * *